(12) United States Patent
Patel et al.

(10) Patent No.: US 7,094,738 B2
(45) Date of Patent: Aug. 22, 2006

(54) PHOSPHOLIPID LUBRICATING AGENTS IN AQUEOUS BASED DRILLING FLUIDS

(75) Inventors: Arvind D. Patel, Sugarland, TX (US); Eric Davis, Houston, TX (US); Steven Young, Cypress, TX (US); Emanuel Stamatakis, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 10/937,127

(22) Filed: Sep. 9, 2004

(65) Prior Publication Data
US 2005/0054540 A1    Mar. 10, 2005

Related U.S. Application Data

(60) Provisional application No. 60/501,796, filed on Sep. 10, 2003.

(51) Int. Cl.
C04B 7/42     (2006.01)
C09K 8/22     (2006.01)
C09K 8/36     (2006.01)

(52) U.S. Cl. ............ 507/128; 507/129; 507/131; 507/139; 507/140; 507/141; 507/145; 166/305.1

(58) Field of Classification Search ............ None
See application file for complete search history.

(56) References Cited

U.S. PATENT DOCUMENTS 4,811,791 A * 3/1989 Harnoy et al. ............ 166/305.1

2004/0234484 A1* 11/2004 Peffly et al. ............. 424/70.13

FOREIGN PATENT DOCUMENTS

WO    WO 01/81498    * 11/2001

* cited by examiner

*Primary Examiner*—Randy Gulakowski
*Assistant Examiner*—Charles R. Richard
(74) *Attorney, Agent, or Firm*—M-I L.L.C.; Carter J. White

(57) ABSTRACT

A method of improving the lubricity of an aqueous based drilling fluid composed of an aqueous base fluid, and a weighting agent. The method involves the addition of an effective amount of a phospholipid to substantially reduce the coefficient of friction when compared to the fluid absent the phospholipids. Preferably the phospholipids have the structure:

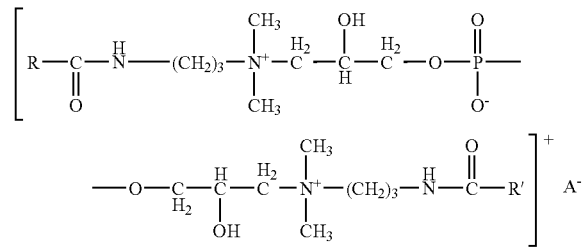

in which R and R' are $C_6$ to $C_{25}$ hydrocarbon groups; and A is an anion to counter the cationic charge.

7 Claims, 2 Drawing Sheets

PHOSPHOLIPID LUBRICATING AGENTS IN AQUEOUS BASED DRILLING FLUIDS

This application is a non-provisional of U.S. provisional application No. 60/501,796, filed Sep. 10, 2003, the contents of which are incorporated herein by reference.

BACKGROUND

Various lubricants and lubricating agents have been used in drilling applications and in aqueous based drilling fluids. Lubricants such as surfactants, solid materials like glass beads, graphite, hydrocarbons like polyalphaolefins, synthetic and natural oils like glycols, fatty acid esters have all been reported in the literature as being useful in aqueous based drilling fluids. A good number of these materials are not soluble or compatible with aqueous based drilling fluids. Most of these lubricants, whether soluble or insoluble, require significant concentration to perform as lubricants.

For example it is reported that glycol and glycol ether products, more particularly the reaction product between 2-ethylhexanol and the epoxide of 1-hexadecene may be used as lubricants in aqueous drilling fluids. These products are reported to enhance the lubricity of water-based drilling fluids. Another reported lubricant for aqueous based fluids including glycol and glycol ether products, particularly the reaction product between 2-ethylhexanol and the epoxide of 1-hexadecene. These products are reported to enhance the lubricity of water-based drilling fluids. The literature also describes a lubricant system composed of a surfactant (preferably aluminum stearate), a viscosifier (oil-compatible bentonite or polyacrylamide), a filming amine, an activator (petroleum solvent, coconut oil, terpene, xylene, mineral oil, turpentine, d-limonene or mixtures thereof), and a diluent (diesel fuel, fuel oil, gasoline, naphtha, kerosene, or jet fuel). When the lubricant formulation is dispersed in the drilling fluid, the filming amine coats the metal; and friction associated with the drilling operation causes formation of a lubricious emulsion. A drilling fluid additive utilizing a monocyclic terpene (e.g., d-limonene) and an oil, such as mineral oil or vegetable oil is also reported in the literature. The additive is mixed into a water-based drilling fluid in the range of 1–8% by volume and is reported to provide improved rate of penetration, high lubricity and low toxicity.

One of skill in the art should appreciate that clear brines are often used in the drilling of subterranean wells during the penetration of the target formation and are often called completion fluids. Brine based drilling muds are also well known to one of skill in the art of drilling. Unfortunately, many if not all of the known lubricants useful in aqueous based drilling fluids are not compatible with clear brines or drilling muds that have brine as a major component. Thus there remains an unmet need for a lubricant for brine-based drilling fluids especially clear brines.

SUMMARY

The claimed subject matter includes a method of improving the lubricity of an aqueous based drilling fluids. An illustrative drilling fluid is composed of an aqueous base fluid, and a weighting agent, which is preferably a water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds well known to one of skill in the art. The method to improve lubricity involves adding an effective amount of one or more phospholipid compounds to substantially reduce the coefficient of friction when compared to the fluid absent the phospholipids. In one preferred and illustrative embodiment, the phospholipids compounds have the generalized molecular structure of:

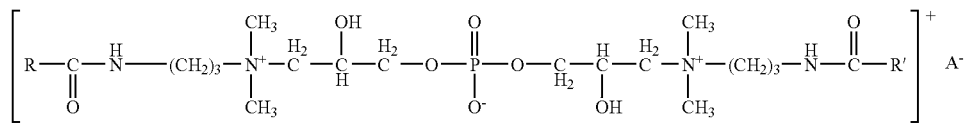

in which R and R' are $C_6$ to $C_{25}$ hydrocarbon groups and A is any suitable anion to counter the cationic charge, preferably a conjugate base of a strong inorganic acid or organic acid. Preferably, the anion is selected from the group consisting of halide, nitrate, sulfate, phosphate, anions of $C_1$ to $C_{10}$ organic acids, and combinations of these. In another preferred and illustrative embodiment, the phospholipids includes one or more fatty acid amidopropyl propylene glycol dimonium phosphate salt in which the fatty acid is a $C_{10}$–$C_{25}$ fatty acid. Optionally, the drilling fluid may include such conventional components such as a solid weighting agents, fluid loss control agents, viscosifiers, and the like which should be well known to one of skill in the art of drilling fluid formulation.

The claimed subject matter also encompasses a method of drilling a subterranean formation utilizing an aqueous based drilling fluid having improved lubricity. The illustrative drilling fluid is composed of an aqueous base fluid, composed of an aqueous base fluid, and a weighting agent, which is preferably a water soluble salt selected from the group comprising alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds well known to one of skill in the art. The improvement in lubricity is achieved by adding an effective amount of one or more phospholipids compound to substantially reduce the coefficient of friction when compared to the fluid absent the phospholipids In one such illustrative embodiment, the phospholipids compounds have the generalized molecular structure:

metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds. The improved fluid includes an effective amount of one or more phospholipids compounds which substantially reduce the coefficient of friction when compared to the fluid absent the phospholipids. In one illustrative embodiment, the phospholipids compounds have the generalized molecular structure:

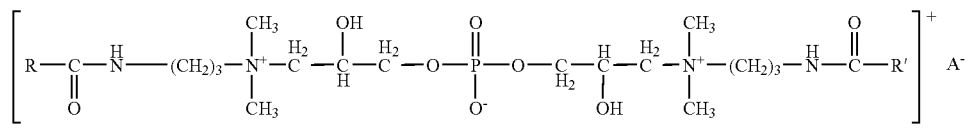

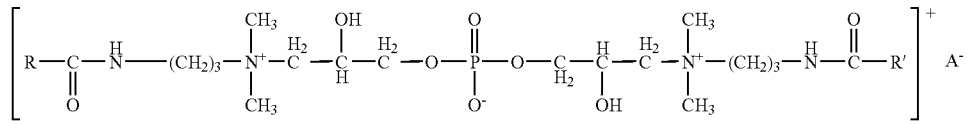

in which R and R' are $C_6$ to $C_{25}$ hydrocarbon groups and A is any suitable anion to counter the cationic charge, preferably a conjugate base of a strong inorganic acid or organic acid. Preferably, the anion for the phospholipids compound is selected from halide, nitrate, sulfate, phosphate, anions of $C_1$ to $C_{10}$ organic acids, and combinations of these and similar compounds well known to one of skill in the art. In another preferred and illustrative embodiment, the phospholipids includes one or more fatty acid amidopropyl propylene glycol dimonium phosphate salt in which the fatty acid is a $C_{10}$–$C_{25}$ fatty acid. Optionally, the drilling fluid may include such conventional components such as a solid weighting agents, fluid loss control agents, viscosifier, and the like which should be well known to one of skill in the art of drilling fluid formulation.

in which R and R' are $C_6$ to $C_{25}$ hydrocarbon groups and A is any suitable anion to counter the cationic charge, preferably a conjugate base of a strong inorganic acid or organic acid. Preferably, the anion for the phospholipids compound is selected from halide, nitrate, sulfate, phosphate, anions of $C_1$ to $C_{10}$ organic acids, and combinations of these and similar compounds well known to one of skill in the art. In another preferred and illustrative embodiment, the phospholipids includes one or more fatty acid amidopropyl propylene glycol dimonium phosphate salt in which the fatty acid is a $C_{10}$–$C_{25}$ fatty acid. Optionally, the drilling fluid may include such conventional components such as a solid weighting agents, fluid loss control agents, viscosifer, and the like which should be well known to one of skill in the art of drilling fluid formulation.

Further it should be appreciated that the claimed subject matter includes a brine based drilling fluid exhibiting increased lubricity as compared to a conventionally formulated drilling fluid. One such illustrative brine based drilling fluid includes an aqueous base fluid, composed of an aqueous base fluid, and a weighting agent, which is preferably a water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth

DESCRIPTION OF THE FIGURES

The following figures are referenced as part of the description of the claimed subject matter:

DETAILED DESCRIPTION

Figure 1:
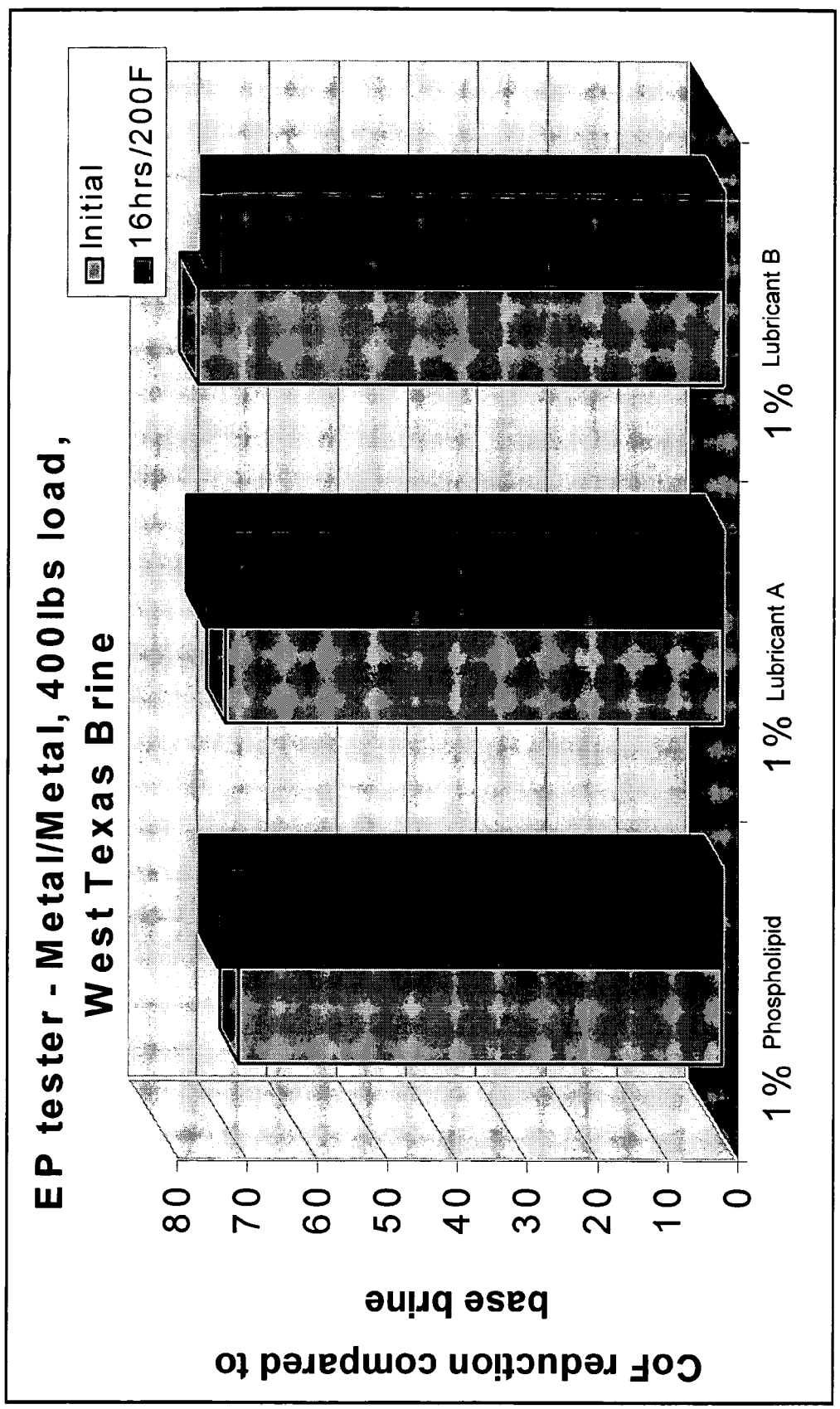
FIG. 1 is a graphical representation of the reduction in the coefficient of friction achieved by the claimed subject matter.

The claimed subject matter is directed to a water-base drilling fluid for use in drilling wells. Generally the drilling fluid of the claimed subject matter may be formulated to include an aqueous continuous phase, a weighting agent and a lubricant/lubricating agent as disclosed herein. As disclosed below, the drilling fluids of the claimed subject matter may optionally include additional components, such as viscosity agents, fluid loss control agents, bridging agents, anti-bit balling agents, corrosion inhibition agents, alkali reserve materials and buffering agents, surfactants and suspending agents, rate of penetration enhancing agents and the like that one of skill in the art should understand may be added to an aqueous based drilling fluid.

The present invention is directed to a lubricant/lubricating agent that is compatible with aqueous based drilling fluids, especially brackish water field brines. The lubricant should be stable up to temperatures of 200° F. and give lubricity values greater than 25% and preferably greater than 35% reduction compared to untreated brines. In addition the lubricant should exhibit a minimal amount or tendency to grease, "cheese", foam, or emulsify when added to the brine.

The aqueous based continuous phase may generally be any water based fluid phase that is compatible with the formulation of a drilling fluid and is compatible with the lubricants disclosed herein. In one preferred embodiment, the aqueous based continuous phase is selected from: fresh water, sea water, brine, mixtures of water and water soluble organic compounds mixtures of water and water soluble organic compounds, and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

A lubricant is included in the formulation of the drilling fluids of the claimed subject matter so that there is substantive reduction in the friction of the drill string. Thus, the lubricant should be present in sufficient concentration to reduce either or both the friction between the drilling string and the walls of the wellbore. The exact amount of the lubricant present in a particular drilling fluid formulation can be determined by a trial and error method of testing the combination of drilling fluid and lubricant and the reduction in friction achieved. Generally however, the lubricant of the claimed subject matter may be used in drilling fluids in a concentration from about 0.01 to about 20 pounds per barrel (lbs/bbl or ppb) and more preferably in a concentration from about 0.1 to about 10 pounds per barrel of drilling fluid.

The lubricating agents of the claimed subject matter are phospholipids of fatty acids. One of skill in the art will appreciate that phospholipids are like tri-glycerides except that the first hydroxyl of the glycerin molecule has polar phosphate containing group in place of the fatty acid. Thus, the phospholipids have a hydrophilic head and a hydrophobic tail, which leads to the formation of a bi-layer in water.

In selecting the phospholipids of the present invention, one should take into account that the compounds should be: a) water soluble; b) compatible with divalent cations (such as $Ca^{2+}$ and/or $Mg^{2+}$) and not form a soap (i.e. "cheese out" or "grease out") in sea water under basic conditions (i.e. pH greater than 10.5). Phospholipids useful in the practice of the presently claimed subject matter may have the general formula:

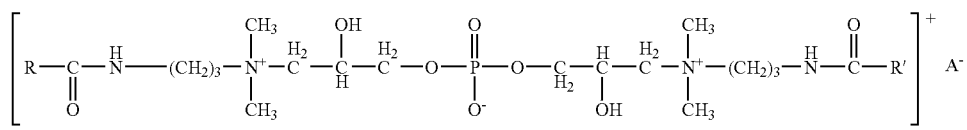

in which R and R' are $C_6$ to $C_{25}$ hydrocarbon groups and A is any suitable anion to counter the cationic charge, preferably a conjugate base of a strong inorganic acid or organic acid. The anion, more preferably may be selected from halide, nitrate, sulfate, phosphate, anions of $C_1$ to $C_{10}$ organic acids, as well as combinations of these and other similar anions that should be known to one of skill in the art. Another preferred and illustrative embodiment involves the use of phospholipids including one or more fatty acid amidopropyl propylene glycol dimonium phosphate salt in which the fatty acid is a $C_{10}$–$C_{25}$ fatty acid. In one particularly preferred embodiment the lubricating agent is cocamidopropyl PG-dimonium chloride phosphate which is also known as 1-Propanaminium 3,3',3"-[phosphinylidynetris (oxy)]tris[N-(3-aminopropyl)-2 -hydroxy-N,N-dimethyl-N, N',N"-tri-$C_{6-18}$ acyl derivatives. Trichlorides available under the trade name COLALIPID C™ from Colonial Chemical Inc., of South Pittsburgh Tenn. In another particularly preferred embodiment, the lubricating agent is ricinoleamidopropyl PG-dimonium chloride phosphate which is sold under the trade name COLALIPID RC™ from Colonial Chemical, Inc. of South Pittsburgh, Tenn.

The drilling fluids of the claimed subject matter include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled. Weight materials suitable for use in the formulation of the drilling fluids of the claimed subject matter may be generally selected from any type of weighting materials be it in a solid particulate form, suspended in solution, dissolved in the aqueous phase as part of the preparation process or added afterward during drilling. In one illustrative embodiment, the weight material may be selected from the group including barite, hematite, iron oxide, calcium carbonate, magnesium carbonate, aqueous soluble organic and inorganic salts, and mixtures and combinations of these compounds and similar such weight materials that may be utilized in the formulation of drilling fluids. The weighting agent is a salt which is more preferably a water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, rare earth metal nitrates; transition metal halides, transition metal nitrates; transition metal sulfates, transition metal formates; transition metal acetates, transition metal propionates, and combinations of these and similar compounds well known to one of skill in the art.

The drilling fluids of the claimed subject matter can optionally include a viscosifying agent in order to alter or maintain the rheological properties of the fluid. The primary purpose for such viscosifying agents is to control the viscosity and potential changes in viscosity of the drilling fluid. Viscosity control is particularly important because often a subterranean formation may have a temperature significantly higher than the surface temperature. Thus a drilling fluid may undergo temperature extremes of nearly freezing temperatures to nearly the boiling temperature of water or higher during the course of its transit from the surface to the drill bit and back. One of skill in the art should know and understand that such changes in temperature can result in significant changes in the Theological properties of fluids. Thus in order to control and/or moderate the rheology changes, viscosity agents and rheology control agents may be included in the formulation of the drilling fluid. Viscosifying agents suitable for use in the formulation of the drilling fluids of the claimed subject matter may be generally selected from any type of viscosifying agents suitable for use in aqueous based drilling fluids. In one illustrative embodiment, an optional viscosifying agent is included in the drilling fluid and the viscosifying agent is preferably selected mixtures and combinations of compounds that should be known to one of skill in the art such as xanthan gums, starches, modified starches and synthetic viscosifiers such as polyarcylamides, and the like.

In addition to the components noted above, the claimed drilling fluids may also be formulated to include materials generically referred to as alkali reserve and alkali buffering agent, gelling materials, thinners, and fluid loss control agents, as well as other compounds and materials which are optionally added to water base drilling fluid formulations. Of these additional materials, each can be added to the formulation in a concentration as Theologically and functionally required by drilling conditions.

One of skill in the art should appreciate that lime is the principle alkali reserve agent utilized in formulating water based drilling fluids. Alkali buffering agents, such as cyclic organic amines, sterically hindered amines, amides of fatty acids and the like may also be included to serve as a buffer against the loss of the alkali reserve agent. The drilling fluid may also contain anticorrosion agents as well to prevent corrosion of the metal components of the drilling operational equipment. Gelling materials are also often used in aqueous based drilling fluids and these include bentonite, sepiolite, clay, attapulgite clay, anionic high-molecular weight polymers and biopolymers. Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the claimed subject matter that are generally selected from a group consisting of synthetic organic polymers, biopolymers, and mixtures thereof. The fluid loss control agents such as modified lignite, polymers, modified starches and modified celluloses may also be added to the water base drilling fluid system of this invention. In one embodiment it is preferred that the additives of the invention should be selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gun, mixtures of these and the like.

Other additives that could be present in the drilling fluids of the claimed subject matter include products such as penetration rate enhancers, defoamers, fluid loss circulation products and so forth. Such compounds should be known to one of ordinary skill in the art of formulating aqueous based drilling fluids.

The following examples are included to demonstrate preferred embodiments of the claimed subject matter. It should be appreciated by those of skill in the art that the techniques disclosed in the examples which follow represent techniques discovered by the inventors to function well in the practice of the claimed subject matter, and thus can be considered to constitute preferred modes for its practice. However, those of skill in the art should, in light of the present disclosure, appreciate that many changes can be made in the specific embodiments which are disclosed and still obtain a like or similar result without departing from the scope of the claimed subject matter.

Unless otherwise stated, all starting materials are commercially available and standard laboratory techniques and equipment are utilized.

EXAMPLE 1

The following test can be carried out to determine the compatibility of any specific phospholipid that may be useful as a lubricating agent within the scope of the presently claimed subject matter.

The test fluid is a West Texas Brine drilling fluid formulated in fresh water and including: 10.0 pounds per gallon (ppg) sodium chloride which was diluted to 9.5 ppg with Seawater and caustic added to achieve a pH about 10.5.

In carrying out the following test, a predetermined amount of lubricant (about 1% vol.) is added to a West Texas Brine drilling fluid. The lubricant is soluble in the test fluid if no phase separation is observed. If the lubricant mixed in the brine causes precipitation, greasing, cheezing or heavy cloudiness, then it is deemed to be incompatible.

A pre-measured amount (1% by volume) of the test phospholipid (cocamidopropyl PG-dimonium chloride phosphate) is added and the sample sheared using a Hamilton-Beach mixer for 5 minutes until uniform. Control samples of state of the art lubricants were also prepared and tested. Lubricant A is StarGlide commercially available from MI LLC, Houston, Tex. Lubricant B is EZ-GLIDE commercially available from Halliburton Services, Houston Tex. The samples were then allowed to stand for about 1 hour. The following data exemplify the results:

| Aqueous Fluid | Lubricant | Soluble | Greasing | Foaming |
| --- | --- | --- | --- | --- |
| 20% NaCl/pH10 | phospholipid | + | 0 | + |
|  | Lubricant A | + | + | + |
|  | Lubricant B | 0 | ++ | + |
| Seawater/pH 7 | phospholipid | +++ | 0 | + |
|  | Lubricant A | + | + | ++ |
|  | Lubricant B | + | ++ | ++ |

-continued

| Aqueous Fluid | Lubricant | Soluble | Greasing | Foaming |
|---|---|---|---|---|
| West Texas Brine/ pH10 | phospholipid | +++ | 0 | + |
| | Lubricant A | 0 | ++ | ++ |
| | Lubricant B | 0 | +++ | ++ |

In the above table a + indicates the occurrence of the effect.

Upon review of the above data, one of skill in the art should appreciate that neither of the state of the art lubricants are compatible with the fluids being tested. That is to say the compounds "cheese out" or "grease out" upon standing.

The metal to metal lubricity of each sample was tested on a Fann EP/Lubricity tester. Lubricity of a given fluid is determined by forcing a metal block against a rotating ring. The ring and block are made of like metal. The lubricity coefficient is calculated by comparing the background torque (i.e. no lubricant present) of the block forced against the rotating ring. The ring rotates at 60 rpm and the force applied to the block is about 150 in-lb.

Figure 2:
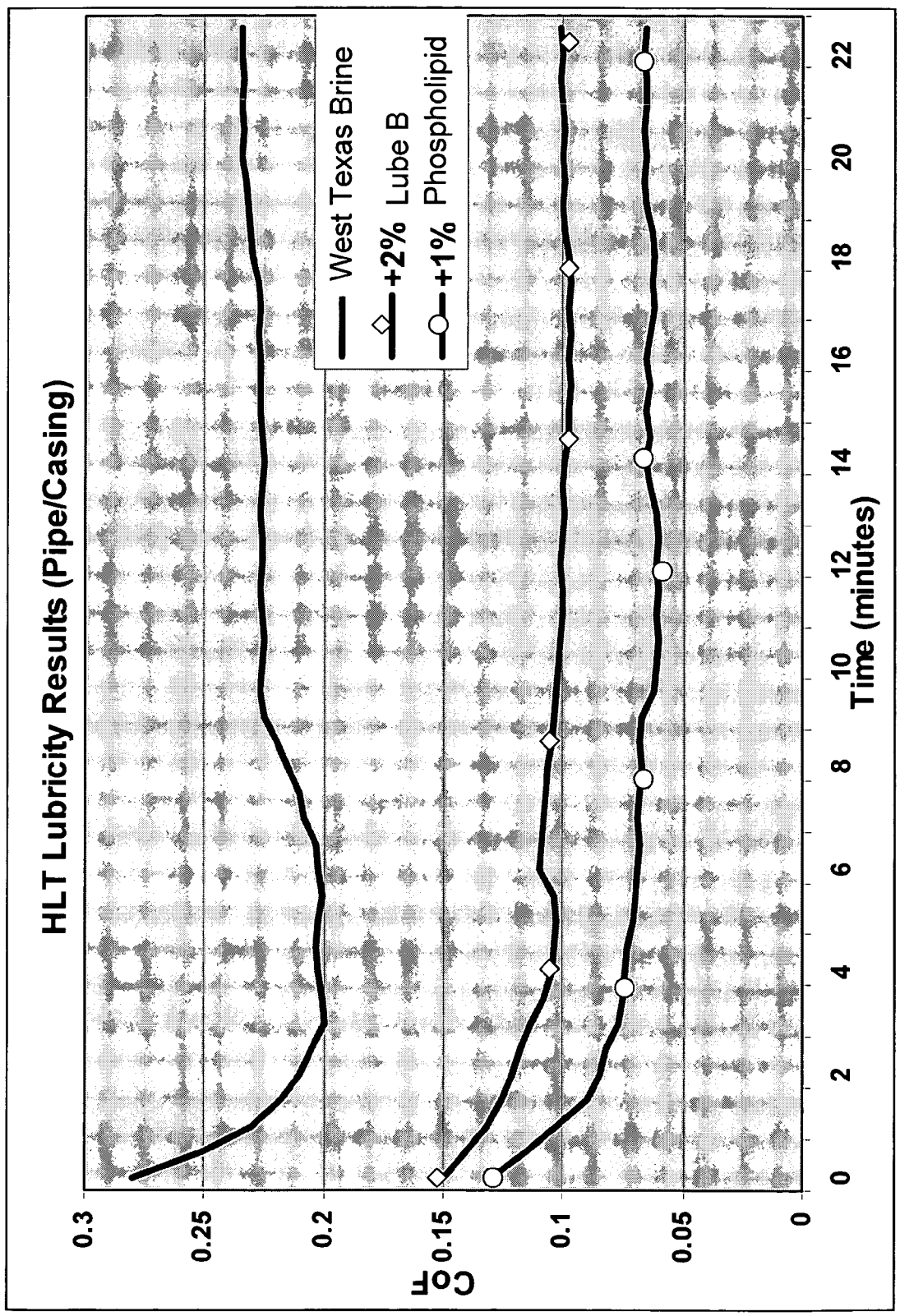
FIG. 2 is a graphical representation of the comparison in the lubricity achieved by the claimed subject matter.

The lubricity tests were also carried out on a high temperature lubricity tester (metal to metal), which measured the coefficient of friction at elevated temperatures. The graphs shown in FIG. 1 and FIG. 2 contain representative data. Upon review of the illustrated data, one of skill in the art should understand and appreciate that the phospholipid of the present invention give comparable performance to the two state of the art lubricant compounds on a metal/metal tester. In each case the lubricants show approximately a 70% reduction in torque compared to untreated brine. When tested on a high temperature lubricity tester the phospholipid lubricant agent (at 1% by volume) gave a 67% reduction in torque. This is compared to a 55% reduction in torque achieved using 2% by volume of Lubricant B. Thus one of skill in the art should conclude that the lubricating agents of the present invention give a greater reduction in torque at a lower concentration than a current state of the art lubricant.

EXAMPLE 2

The performance of the phospholipid lubricating agents disclosed herein are demonstrated by the following example.

A lab formulated West Texas field brine was utilized as the test fluid. The test fluid was made up of a 10 ppg NaCl brine diluted back to 9.5 ppg with seawater. Lubricant concentrations ranging from about 0.01%–1% by volume were tested and compared to the two state of the art lubricants (Lubricant A and Lubricant B) noted above.

The metal to metal lubricity of each sample was tested on a Fann EP/Lubricity tester. Lubricity of a given fluid is determined by forcing a metal block against a rotating ring. The ring and block are made of like metal. The lubricity coefficient is calculated by comparing the background torque (i.e. no lubricant present) of the block forced against the rotating ring. The ring rotates at 60 rpm and the force applied to the block is about 150 in-lb.

The reduction in friction compared to untreated brine was determined before and after heat aging the fluids for 16 hours at 200 F.

The following data is representative of the results:

| | Initial | Heat Aged (16 hours @ 200 F.) |
|---|---|---|
| West Texas field brine | 100% | 100% |
| 0.25% PLA - A | 72% | 69% |

-continued

| | Initial | Heat Aged (16 hours @ 200 F.) |
|---|---|---|
| 1% Lubricant A | 74% | 71% |
| 1% Lubricant B | 72% | 75% |

Upon review of the above data, one of skill in the art should appreciate that the phospholipid lubricating agents of the present invention achieve a reduction in Friction comparable to the state of the art lubricants at a significantly lower concentration.

After heat aging, the addition of caustic (i.e. lime) resulted in heavy cheesing out in the Lubricant A and Lubricant B samples. A slight precipitate appeared to form with the phospholipid lubricating agent (PLA-A).

The above results were repeated using the phospholipid lubricating agents of the present invention and Lubricant B. The phospholipid lubricating agent (PLA-A) (cocamidopropyl PG-dimonium chloride phosphate) was used at 0.25%, 0.50% and 1% by volume. Lubricant B was used at a 2% by volume (the recommended concentration) concentration.

The lubricity tests were carried out on a high temperature lubricity tester (metal to metal), which measured the coefficient of friction at elevated temperatures. The following tables contain representative data:

| | C.O.F. at time point | | | | |
|---|---|---|---|---|---|
| Test Fluid | 0 min. | 5 min. | 10 min. | 15 min. | 20 min. |
| Base Fluid | 0.2826 | 0.2072 | 0.2167 | 0.2180 | 0.2259 |
| 0.25% PLA - A | 0.1316 | 0.0738 | 0.0652 | 0.0724 | 0.077 |
| 0.50% PLA - A | 0.1045 | 0.0876 | 0.0854 | 0.0826 | 0.0823 |
| 1.0% PLA - A | 0.0928 | 0.0874 | 0.0848 | 0.0850 | 0.0858 |
| 2.0% Lubricant B | 0.1401 | 0.1109 | 0.1039 | 0.0909 | 0.0962 |

Upon review of the above data one of skill in the art should appreciate that the phospholipid lubricating agent (PLA-A) of the present invention achieves a significant reduction in the torque when compared to the untreated brine. Further it will be noted that these results are achieved at concentrations significantly lower than those recommended for the state of the art Lubricant B.

EXAMPLE 3

The performance of the phospholipid lubricating agents disclosed herein are further illustrated in the following example in which a wide variety of phospholipid lubricating agent (PLA) are utilized.

A lab formulated West Texas field brine was utilized as the test fluid. The test fluid was made up of a 10 ppg NaCl brine diluted back to 9.5 ppg with seawater. A variety of PLA were selected for testing and the following are illustrative sample of the commercially available compounds tested: PLA-B (Cocoamidopropyl PG-Dimonium Chloride Phosphate) commercially available as ARLASILK PHOSPHOLIPID PTC from Uniqema; PLA-C (Cocoamidopropyl PG-Dimonium Chloride Phosphate) commercially available as MONA PL-200 from Uniqema; PLA-D (Cocoamidopropyl PG-Dimonium Chloride Phosphate) commercially available as COLALIPID C from Colonial Chemical; PLA-E (Ricinoleamidopropyl PG-Dimonium Chloride Phosphate) commercially available as COLALIPID RC from Colonial Chemical.

The metal to metal lubricity of each sample was tested on a Fann EP/Lubricity tester. Lubricity of a given fluid is determined by forcing a metal block against a rotating ring. The ring and block are made of like metal. The lubricity coefficient is calculated by comparing the background torque (i.e. no lubricant present) of the block forced against the rotating ring. The ring rotates at 60 rpm and the force applied to the block is about 150 in-lb.

The reduction in friction compared to untreated brine was determined before and after heat aging the fluids for 16 hours at 200 F.

The following data is representative of the results:

| Before Heat Aging | | |
|---|---|---|
| | Torque (inch-pounds) | |
| | After 5 min. | After 10 min. |
| West Texas Brine | 33.7 | 34.8 |
| 0.25% (wt) PLA - B | 9.9 | 9.9 |
| 0.25% (wt) PLA - C | 9.6 | 9.4 |
| 0.25% (wt) PLA - D | 13.7 | 12.8 |
| 0.25% (wt) PLA - E | 14.5 | 13.4 |

| After Heat Aging for 16 h at 200 F. | | |
|---|---|---|
| | Torque (inch-pounds) | |
| | After 5 min. | After 10 min. |
| West Texas Brine | 33.7 | 36.6 |
| 0.25% (wt) PLA - B | 11.7 | 11.3 |
| 0.25% (wt) PLA - C | 10.7 | 10.4 |
| 0.25% (wt) PLA - D | 11.8 | 11.4 |
| 0.25% (wt) PLA - E | 11.5 | 11.0 |

Upon review of the above, one of skill in the art should appreciate that a wide range of phospholipids compounds may be utilized to substantially reduce the coefficient of friction (as reflected by the lowering of torque values) in the illustrative brine fluid.

Upon review of the above, one of skill in the art should appreciate that a wide range of phospholipids compounds may be utilized to substantially reduce the coefficient of friction (as reflected by the lowering of torque values) in the illustrative brine fluid.

EXAMPLE 4

The phospholipid lubricating agents disclosed herein are useful in a wide variety of brine formulations. An variety of brines were conventionally formulated and a representative phospholipids lubricating agent (PLA-B (Cocoamidopropyl PG-Dimonium Chloride Phosphate) commercially available as ARLASILK PHOSPHOLIPID PTC from Uniqema) at 1% weight concentration added and tested as in the prior examples. The following tables present representative data:

| Before Heat Aging | | |
|---|---|---|
| | Torque (inch-pounds) | |
| | After 5 min. | After 10 min. |
| 4% NaCl Brine | 39.6 | 40.2 |
| 4% NaCl Brine + PLA - B | 12.8 | 12.6 |
| 4% KCl Brine | 38.7 | 38.7 |
| 4% KCl Brine + PLA - B | 11.8 | 11.4 |
| 4% CaCl$_2$ Brine | 37.0 | 37.0 |
| 4% CaCl$_2$ Brine + PLA - B | 12.9 | 12.8 |

| After Heat Aging for 16 h at 200 F. | | |
|---|---|---|
| | Torque (inch-pounds) | |
| | After 5 min. | After 10 min. |
| 4% NaCl Brine + PLA - B | 11.9 | 11.2 |
| 4% KCl Brine + PLA - B | 12.0 | 11.6 |
| 4% CaCl$_2$ Brine + PLA - B | 12.4 | 12.2 |

Upon review of the above data, one of ordinary skill in the art should appreciate that the addition of the phospholipids lubricating agent (PLA-B) substantially reduces the coefficient of friction (as reflected in the reduction in torque) of the brine fluids regardless of the salt used to formulate the brine.

EXAMPLE 5

The performance of the phospholipid lubricating agents disclosed herein are useful in aqueous based drilling muds as demonstrated by the following example. An aqueous 9 based shale inhibitive drilling mud was conventionally formulated as follows:

| Component | Concentration (g) |
|---|---|
| Water | 292.70 |
| Sea Salt | 12.51 |
| Barite | 25.12 |
| NaCl | 74.48 |
| EMI-693 | 10.50 |
| Duovis | 1.00 |
| EMI-636 | 2.00 |
| EMI-542P | 2.00 |

Lubricants illustrative of the claimed subject matter were added to the above base mud formulation and heat aged at 150° F. for 16 hours.

The metal to metal lubricity of each sample was tested on a Fann EP/Lubricity tester. Lubricity of a given fluid is determined by forcing a metal block against a rotating ring. The ring and block are made of like metal. The lubricity coefficient is calculated by comparing the background torque (i.e. no lubricant present) of the block forced against the rotating ring. The ring rotates at 60 rpm and the force applied to the block is about 150 in-lb. The following results are generally representative:

|  | Torque (inch-pounds) | |
| --- | --- | --- |
|  | After 5 min. | After 10 min. |
| Base Mud | 20.7 | 20.1 |
| Base Mud + 2% weight PLA - A | 16.2 | 16.2 |
| Base Mud + 2% Lubricant B | 19.8 | 19.4 |

In view of the above results, one of skill in the art should appreciate and understand that the addition of PLA-A (cocamidopropyl PG-dimonium chloride phosphate) into the drilling mud substantially reduce the coefficient of friction (as reflected by the torque measurements) when compared to the fluid absent the phospholipids. Further it should be appreciated that there is a substantial reduction in the coefficient of friction when compared to the current state of the art lubricant (Lubricant B, EZ Glide available from Halliburton)

In view of the above, one of skill in the art should appreciate that one illustrative embodiment of the claimed subject matter includes a method of improving the lubricity of an aqueous based drilling fluid. The illustrative drilling fluid is composed of an aqueous base fluid, and a weighting agent, which is preferably a water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds well known to one of skill in the art. The method to improve lubricity involves adding an effective amount of one or more phospholipid compounds to substantially reduce the coefficient of friction when compared to the fluid absent the phospholipids. In one preferred and illustrative embodiment, the phospholipids compounds have the generalized molecular structure of:

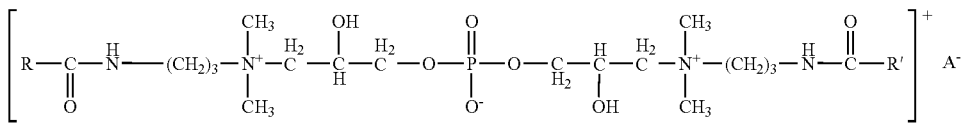

in which R and R' are $C_6$ to $C_{25}$ hydrocarbon groups and A is any suitable anion to counter the cationic charge, preferably a conjugate base of a strong inorganic acid or organic acid. In another preferred and illustrative embodiment, the phospholipids includes one or more fatty acid amidopropyl propylene glycol dimonium phosphate salt in which the fatty acid is a $C_{10}$ to $C_{25}$ fatty acid. Optionally, the drilling fluid may include such conventional components such as a solid weighting agents, fluid loss control agents, viscosifiers and the like which should be well known to one of skill in the art of drilling fluid formulation.

The claimed subject matter also encompasses a method of drilling a subterranean formation utilizing an aqueous based drilling fluid having improved lubricity. The illustrative drilling fluid is composed of an aqueous base fluid, and a weighting agent, which is preferably a water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds well known to one of skill in the art. The improvement in lubricity is achieved by adding an effective amount of one or more phospholipids compound to substantially reduce the coefficient of friction when compared to the fluid absent the phospholipids In one such illustrative embodiment, the phospholipids compounds have the generalized molecular structure:

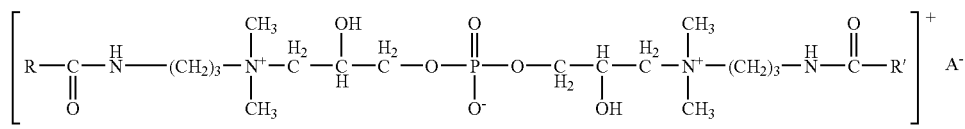

in which R and R' are $C_6$ to $C_{25}$ hydrocarbon groups and A is any suitable anion to counter the cationic charge, preferably a conjugate base of a strong inorganic acid or organic acid. Preferably, the anion for the phospholipids compound is selected from halide, nitrate, sulfate, phosphate, anions of $C_1$ to $C_{10}$ organic acids, and combinations of these and similar compounds well known to one of skill in the art. In another preferred and illustrative embodiment, the phospholipids includes one or more fatty acid amidopropyl propylene glycol dimonium phosphate salt in which the fatty acid is a $C_{10}$ to $C_{25}$ fatty acid. Optionally, the drilling fluid may include such conventional components such as a solid weighting agents, fluid loss control agents, viscosifiers and the like which should be well known to one of skill in the art of drilling fluid formulation.

Further it should be appreciated that the claimed subject matter includes a brine based drilling fluid exhibiting increased lubricity as compared to a conventionally formulated drilling fluid. One such illustrative brine based drilling fluid includes an aqueous base fluid, and a weighting agent, which is preferably a water soluble salt selected from alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations of these and similar compounds. The improved fluid includes an effective amount of one or more phospholipids compounds which substantially reduce the coefficient of friction when compared to the fluid absent the phospholipids. In one illustrative embodiment, the phospholipids compounds have the generalized molecular structure:

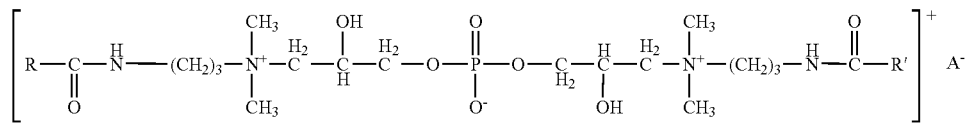

in which R and R' are $C_6$ to $C_{25}$ hydrocarbon groups and A is any suitable anion to counter the cationic charge, preferably a conjugate base of a strong inorganic acid or organic acid. Preferably, the anion for the phospholipids compound is selected from halide, nitrate, sulfate, phosphate, anions of $C_1$ to $C_{10}$ organic acids, and combinations of these and similar compounds well known to one of skill in the art. In another preferred and illustrative embodiment, the phospholipids includes one or more fatty acid amidopropyl propylene glycol dimonium phosphate salt in which the fatty acid is a $C_{10}$ to $C_{25}$ fatty acid. Optionally, the drilling fluid may include such conventional components such as a solid weighting agents, fluid loss control agents, and the like which should be well known to one of skill in the art of drilling fluid formulation.

While the compositions and methods of this disclosed subject matter have been described in terms of preferred embodiments, it will be apparent to those of skill in the art that variations may be applied to the process described herein without departing from the concept and scope of the subject matter. All such similar substitutes and modifications apparent to those skilled in the art are deemed to be within the scope and concept of the subject matter as it is set out in this disclosure.

What is claimed is:

1. A method of drilling a subterranean formation utilizing an aqueous based drilling fluid, wherein the drilling fluid is composed of an aqueous base fluid, and a weighting agent, wherein the weighting agent is a salt selected from the group consisting of alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations thereof, wherein the improvement comprising, adding an effective amount of one or more phospholipid to substantially reduce the coefficient of friction when compared to the fluid absent the phospholipids, and wherein the phospholipid has the structure:

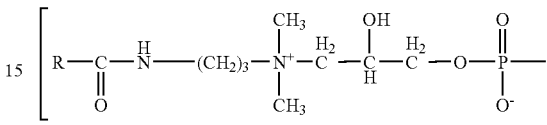

-continued

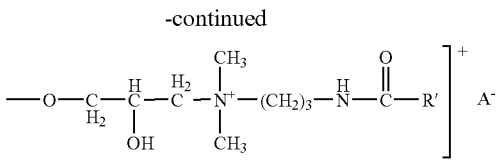

in which R and R' are $C_6$ to $C_{25}$ hydrocarbon groups and A is an anion to counter the cationic charge.

2. The method of claim 1, wherein the anion is selected from the group consisting of halide, nitrate, sulfate, phosphate, anions of $C_1$ to $C_{10}$ organic acids, and combinations of these.

3. The method of claim 1, wherein the drilling fluid further includes a solid weighting agents.

4. The method of claim 1, wherein the drilling fluid further includes a fluid loss control agent.

5. The method of claim 1, A method of drilling a subterranean formation utilizing an aqueous based drilling fluid, wherein the drilling fluid is composed of an aqueous base fluid, and a weighting agent, wherein the weighting agent is a salt selected from the group consisting of alkali metal halides, alkali metal nitrates; alkali metal sulfates, alkali metal formates; alkali metal acetates, alkali metal propionates, alkaline earth metal halides, alkaline earth metal nitrates; alkaline earth metal sulfates, alkaline earth metal formates; alkaline earth metal acetates, alkaline earth metal propionates, rare earth metal halides, rare earth metal nitrates; rare earth metal sulfates, rare earth metal formates; rare earth metal acetates, rare earth metal propionates, transition metal halides, transition metal nitrates; transition metal sulfates, transition metal formates; transition metal acetates, transition metal propionates, and combinations thereof, wherein the improvement comprising, adding aneffective amount of one or more phospholipid to substantially reduce the coefficient of friction when compared to the fluid absent the phospholipids, and wherein the phospholipid is a fatty acid amidopropyl propylene glycol dimonium phosphate salt in which the fatty acid is a $C_{10}$ to $C_{25}$ fatty acid.

6. The method of claim 5, wherein the drilling fluid further comprises a solid weighting agent.

7. The method of claim 5, wherein the drilling fluid further comprises a fluid loss control agent.

* * * * *